United States Patent
Hamann et al.

(10) Patent No.: US 7,759,630 B2
(45) Date of Patent: Jul. 20, 2010

(54) METHOD AND APPARATUS FOR THE GENERATION AND CONTROL OF MULTIPLE NEAR-FIELD LIGHT SOURCES AT SUBWAVELENGTH RESOLUTION

(75) Inventors: Hendrik F. Hamann, Yorktown Heights, NY (US); Chie Ching Poon, San Jose, CA (US); Timothy Carl Strand, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 646 days.

(21) Appl. No.: 11/645,827

(22) Filed: Dec. 26, 2006

(65) Prior Publication Data
US 2008/0149809 A1   Jun. 26, 2008

(51) Int. Cl.
*H01J 3/14* (2006.01)
*H01J 5/16* (2006.01)

(52) U.S. Cl. .............. 250/216; 250/227.11; 250/306; 359/894; 977/892

(58) Field of Classification Search ............ 250/216, 250/234–236, 227.11, 309, 306, 307; 372/43.01, 372/50.11, 45.01, 46.01, 96, 75; 359/894; 977/862
See application file for complete search history.

(56) References Cited

U.S. PATENT DOCUMENTS

| | | | |
|---|---|---|---|
| 5,696,372 | A | 12/1997 | Grober et al. |
| 6,614,742 | B2 | 9/2003 | Ucyanagi |
| 6,649,894 | B2 | 11/2003 | Matsumoto et al. |
| 6,714,370 | B2 | 3/2004 | McDaniel et al. |
| 6,768,556 | B1 | 7/2004 | Matsumoto et al. |
| 6,785,445 | B2 | 8/2004 | Kuroda et al. |
| 6,795,380 | B2 | 9/2004 | Akiyama et al. |
| 6,839,191 | B2 | 1/2005 | Sugiura et al. |
| 7,423,265 | B2 * | 9/2008 | Matteo et al. ............ 250/306 |
| 7,501,947 | B2 * | 3/2009 | Youn .................... 340/572.1 |
| 2003/0015651 | A1 | 1/2003 | Kiguchi et al. |
| 2003/0184903 | A1 | 10/2003 | Challener |

(Continued)

FOREIGN PATENT DOCUMENTS

JP       2002063729       2/2002

(Continued)

OTHER PUBLICATIONS

Mitchell "Techniques for Artistically Rendering Space-Filling Curves", Bridges: Mathematical Connections in Art, Music and Science, Conference Proceedings 2002.*

(Continued)

*Primary Examiner*—Georgia Y Epps
*Assistant Examiner*—Francis M Legasse, Jr.
(74) *Attorney, Agent, or Firm*—D'Arcy H. Lorimer; Lorimer Labs

(57) ABSTRACT

Methods and devices for generating multiple, closely spaced, independently controlled near-field light sources are disclosed. By providing an aperture having at least two, orthogonally oriented ridge structures, two or more closely spaced near-field light sources can be generated by controlling the polarization direction of the illuminating radiation. Control of the shape of the aperture, and relative dimensions of the ridge structures allows optimization of the relative intensities of the near-field sources.

13 Claims, 14 Drawing Sheets

U.S. PATENT DOCUMENTS

| | | |
|---|---|---|
| 2003/0223316 A1 | 12/2003 | Saga et al. |
| 2004/0062152 A1 | 4/2004 | Stancil et al. |
| 2005/0030992 A1 | 2/2005 | Thornton et al. |
| 2005/0030993 A1 | 2/2005 | Thornton et al. |
| 2005/0031278 A1 | 2/2005 | Shi et al. |

FOREIGN PATENT DOCUMENTS

| | | |
|---|---|---|
| JP | 2002365416 | 12/2002 |
| WO | WO 01/17079 | 3/2001 |
| WO | WO 2006047337 A2 * | 5/2006 |

OTHER PUBLICATIONS

McClendon "Vitae", p. 5 Date verification for "Techniques for Artistically Rendering Space-Filling Curves".*

Sendur et al., "Ridge waveguide as a near field aperture for high density storage", J. Appl. Phys., Sep. 1, 2004, vol. 96, No. 5.

Matteo et al., "Fractal extensions of near field aperture shapes for enhanced transmission resolution", Optics Express, Jan. 24, 2005, vol. 13, No. 2.

Itagi et al., "Ridge waveguide as a near field optical source", Appl. Phys. Let., Dec. 1, 2003, vol. 83, No. 22.

Chen et al., "Imaging of optical field confinement in ridge waveguides fabricated on very small aperture laser", Appl. Phys. Let., Oct. 20, 2003, vol. 83, No. 16.

Matteo et al., "Spectral analysis of strongly enhanced visible light transmission through single C shaped nanoapertures", Appl. Phys. Let., Oct. 20, 2003, vol. 83, No. 16.

Shi et al., "Mechanisms for enhanced power throughput from planar nanoapertures for near field optical data storage", Mar. 2002, Jpn. J. Appl. Phys., vol. 41.

Shi et al., "Ultra high light transmission through C shaped nanoaperture", Optics Letters, Aug. 1, 2003, vol. 28, No. 15.

Shi et al., "Design of a C aperture to achieve lambda/10 resolution and resonant transmission", J. Opt. Soc. Am. B, Jul. 2004, vol. 21, No. 7.

Sun et al., "Topology visualization of the optical power flow through a novel C-shaped nano aperture", IEEE Visualization 2004, Oct. 10-15, 2004.

Xu et al., "Investigation of the near field distribution at novel nanometric aperture laser", IUMRS-ICEM 2002, Jun. 10-14, 2002.

* cited by examiner

METHOD AND APPARATUS FOR THE GENERATION AND CONTROL OF MULTIPLE NEAR-FIELD LIGHT SOURCES AT SUBWAVELENGTH RESOLUTION

BACKGROUND OF THE INVENTION

1. Field of the Invention

This invention relates to devices for generating near-field light sources. More particularly, the present invention relates to methods and structures for generating multiple, independently controlled near-field light sources at subwavelength resolutions.

2. Description of the Related Art

Near-field light sources are useful for generating subwavelength, intense light sources for use in optical microscopes, optical measurement instruments, spectroscopic instruments, optical recording and optical reproduction equipment, lithography equipment, and for thermally assisted magnetic recording. In the latter application, heat is applied to a magnetic substrate via a very small, but intense light source to reduce the anisotropy of fine grain magnetic structures. These fine grain structures are capable of high recording densities, but have an anisotropy at room temperature that is too high for typical fields produced by conventional recording heads. Heating allows the media to be written with field strengths of conventional heads. However, to be useful for high density recording, the light source utilized for heating must be on the order of 20 to 30 nm in diameter. This is far beyond the optical diffraction limit for conventional light sources such as solid state lasers. Another application of interest for near-field light sources is direct writing photolithography. Since these near-field sources can produce resolutions significantly better than the diffraction limit, finer semiconductor structures can be produced.

One method that can be used to produce such a near-field light source is the ridge aperture of FIG. 1a,b (Prior Art). FIG. 1a (Prior Art) is a schematic plan view 100 of a typical ridge aperture. The device consists of an aperture 106 of length 110 and width 112 placed in an electrically conductive metal film 102. The open area of the aperture 106 is a dielectric film 104. Metal film 102 is supported on a transparent substrate (not shown). The substrate is transparent to the wavelength of incident radiation, and covers the area of aperture 106. Extending into the center portion of aperture 106 is electrically conductive ridge 108, having a width 116 and length 114. The distance between the end of ridge 108 and the side of the aperture opposite to the ridge is gap 118. Ridge 108 is a conductive material which generally is an extension of metal film 102. If the incident radiation (not shown) is polarized in the direction of arrow 122, which is perpendicular to length dimension 114 of ridge 108, little or no near-field light is created. FIG. 1b is a schematic plan view 101 of aperture 106 having the incident radiation (not shown) polarized in a direction indicated by arrow 120, which is parallel to length dimension 114 of ridge 108. In this case, localized plasmons produced by the incident radiation create a near-field light source 124, which appears close to or at the end of ridge 108. Light source 124 can be considerably brighter than the incident radiation passing through the transparent aperture 106. For example, typical dimensions for the near-field aperture of FIG. 1a are length 110=220 nm; width 112=300 nm; ridge length 114=120 nm, ridge width 116=20 to 30 nm; which produces a near-field light source about 20 to 30 nm in diameter. A ridge aperture of this type that delivers near-field light can be designed for input wavelengths range from infrared to ultra violet.

Often, it is desirable to have a plurality of near-field light sources, spaced closely together (within tens of nanometers, for example), and independently controllable of each other. Such sources can be used for alternate and simultaneous track writing in thermally assisted magnetic recording, or for high speed direct write lithography applications. While the prior art illustrates that arrays of near-field apertures, such as those in FIG. 1, can be fabricated, these arrays are usually spaced such that the near-field sources generated are at least the width or length of the aperture apart (on the order of hundreds of nanometers). Additionally, the arrays are oriented in such a manner as to have all light sources on or all off, depending on the direction of the polarization of the incident radiation. What is needed is a method and structure to produce multiple, closely spaced near-field light sources that are independently controllable.

U.S. Pat. No. 5,696,372 discloses a near-field electromagnetic probe that converts an incident energy beam into an interrogating beam which exhibits, in the near-field vicinity of the probe, a transverse dimension that is small in relation to the wavelength of the incident energy beam. The probe comprises an energy source for providing the incident energy beam with a wavelength $\lambda$. An antenna is positioned in the path of the incident energy beam and comprises at least a first conductive region and a second conductive region, both of which have output ends that are electrically separated by a gap whose lateral dimension is substantially less than $\lambda$. The electromagnetic system which produces the incident energy should preferably have its numerical aperture matched to the far-field beam pattern of the antenna. Further, the incident beam should have a direction of polarization which matches the preferred polarization of the antenna. The near-field probe system of the invention can also sense fields in the near-field gap and reradiate these to a far-field optical detector. Thus the probe can serve to both illuminate a sample in the near-field gap, and to collect optical signals from an illuminated sample in the near-field gap.

U.S. Pat. No. 6,649,894 discloses an optical near-field probe of high resolution and high efficiency. A near-field light is generated using a tapered, plane scatterer formed on a substrate surface. The intensity of the near-field light is enhanced by making the area of the scatterer smaller than that of a light spot and by selecting the material, shape, and size of the scatterer so as to generate plasmon resonance. An optical near-field generator having a high light utilization efficiency can be obtained.

U.S. Pat. No. 6,714,370 discloses a recording head for use in conjunction with a magnetic storage medium, comprising a waveguide for providing a path for transmitting radiant energy, a near-field coupling structure positioned in the waveguide and including a plurality of arms, each having a planar section and a bent section, wherein the planar sections are substantially parallel to a surface of the magnetic storage medium, and the bent sections extend toward the magnetic storage medium and are separated to form a gap adjacent to an air bearing surface, and applies a magnetic write field to sections of the magnetic recording medium heated by the radiant energy. A disc drive including the recording head and a method of recording data using the recording head are also provided.

U.S. Pat. No. 6,768,556 discloses a near-field probe including a metallic scatterer fabricated on a substrate in a contour of a circular cone, a polygonal pyramid, a planar ellipse, or a triangle and a film of a metal, a dielectric, or a semiconductor formed in a periphery of the scatterer with film thickness equal to height of the scatterer.

U.S. Pat. No. 6,785,445 discloses a near-field light probe capable of emanating a near-field light having a sufficient intensity while allowing reduction of aperture size to improve resolution. The near-field light probe can be incorporated in a near-field optical microscope, a near-field light lithography apparatus, and a near-field light storage apparatus. A near-field light probe has a configuration in which a light-blocking film is formed with an aperture having slits surrounding the major opening. Light emitted from a light source is coupled into the probe from one side of the light-blocking film, the light being polarized in a predetermined direction with respect to the slits so that a near-field light emanates from the major opening.

U.S. Pat. No. 6,795,380 discloses a pair of members opposed to each other via a gap which are commonly used as an evanescent light probe and a writing magnetic head. When the spacing and width of the gap are smaller than the wavelength λ of injected light, highly intensive evanescent light is generated from the gap position of the opposite surface. Magnetic writing is carried out by applying a recording magnetic field from the pair of members to a medium heated by the evanescent light.

U.S. Pat. No. 6,839,191 discloses an optical near-field generating element provided with: a light shielding member, which is placed on an optical path of light emitted from a light source, for defining a micro opening having a diameter equal to or shorter than a wavelength of the light; and a dielectric film placed in close contact with the micro opening. Alternatively, an optical near-field generating element is provided with a light shielding member, which is placed on an optical path of lights emitted from a light source, for defining a micro opening having a diameter equal to or shorter than a wavelength of the light, the shielding member equipped with: a main portion for defining a basic shape of the micro opening; and a protrusion portion protruding from the main portion toward the center of the micro opening.

US Patent Application Publication 2003/0015651 discloses optical apparatuses using the near-field light where high spatial resolution and high sensitivity are made compatible. Highly intense near-field light is generated in a narrow area using localized plasmons that are produced in a metal pattern in the shape that bears anisotropy and is made to irradiate a measured subject. The direction of polarization of incident light is modulated and signal light is subjected to synchronous detection, so that background light is removed and high sensitivity is achieved.

US Patent Application Publication 2003/0223316 discloses a recording head for decreasing recording noise accompanying malformation of a recorded mark and the formation of a recorded mark capable of increasing reproduction resolution at the time of magnetic reproduction. The head has a light source and a scatterer for recording information on a recording medium by generating near-field light by application of light from the light source and forming a magnetic domain array on the recording medium, a perimeter of the scatterer defines a plurality of vertices and a distance between a first vertex and a last vertex is shorter than the width of the recording track on the recording medium. The recording head improves recording density and can be used to manufacture a highly reliable information recording and reproducing apparatus having a reduced cost per capacity.

US Patent Application Publication 2004/0062152 discloses a device for writing data to a recording medium and a method for fabricating the device. According to one embodiment, the device includes an electrical conductor having a cross-track portion, wherein the cross-track portion includes first and second opposing surfaces, and wherein the cross-track portion defines an aperture extending from the first surface to the second surface. The device also includes a dielectric portion disposed in the aperture such that the dielectric portion defines a ridge waveguide having a lowest-order mode cut-off frequency that is less than the frequency of incident optical energy used to heat the recording medium.

International Publication WO 01/17079 discloses a near-field optical apparatus comprising a conductive sheet or plane having an aperture therein, with the conductive plane including at least one protrusion which extends into the aperture. The location, structure and configuration of the protrusion or protrusions can be controlled to provide desired near-field localization of optical power output associated with the aperture. Preferably, the location, structure and configuration of the protrusion are tailored to maximize near-field localization at generally the center of the aperture. The aperture preferably has a perimeter dimension which is substantially resonant with the output wavelength of the light source, or is otherwise able to support a standing wave of significant amplitude. The apparatus may be embodied in a vertical cavity surface emitting layer or VCSEL having enhanced near-field brightness by providing a conductive layer on the laser emission facet, with a protrusion of the conductive layer extending into an aperture in the emission facet. The aperture in the emission facet preferably has dimensions smaller than the guide mode of the laser, and the aperture preferably defines different regions of reflectivity under the emission facet. The depth of the aperture can be etched to provide a particular target loss, and results in higher optical power extraction from the emission facet.

Sendur et al., in an article entitled "Ridge waveguide as a near-field aperture for high density data storage", Journal of Applied Physics, Volume 96, No. 5, September 2004, discloses the performance of the ridge waveguide as a near-field aperture in data storage systems. Finite element method (FEM) and finite-difference time-domain (FDTD) based software are used in the numerical simulations. To verify the accuracy at optical frequencies, the FEM and FDTD are first compared to analytical results. The accuracy of these techniques for modeling ridge waveguides at optical frequencies is also evaluated by comparing the results with each other for a plane wave illumination. The FEM, which is capable of modeling focused beams, is then used to simulate various geometries involving ridge waveguides. Near-field radiation from ridge waveguide transducer is expressed in terms of power density quantities. Previous studies in the literature consider the performance of the transducer in free space, rather than in the presence of a recording magnetic medium. The effect of the recording magnetic medium on the transmission efficiency and spot size is discussed using numerical simulations. The effect of various geometric parameters on the optical spot size and transmission efficiency is investigated and discussed. Based on the numerical simulations, a promising transducer design is suggested to obtain intense optical spots well below the diffraction limit. Numerical simulations suggest that a full width at half maximum spot diameter of 31 nm in the recording magnetic medium can be obtained. The maximum value of the absorbed optical power density in the recording medium is about $1.67 \times 10^{-4}$ mW/nm3 for a 100 mW input power. In-track and cross-track profiles for this design are compared with Gaussian distributions.

SUMMARY OF THE INVENTION

It is an object of the present invention to provide an optical device for generating multiple near-field light sources including a tee shaped aperture, fashioned in a conductive film, the tee shaped aperture having a first rectangular shaped portion adjacent to a second rectangular shaped portion, the first rectangular shaped portion having a first width, the second rectangular shaped portion having a second width, the first width being measured parallel to the second width, the first width being greater than said second width. The device also includes a first ridge structure, extending a first portion of the conductive film into a central portion of the first rectangular shaped portion of the aperture, in a first direction and, a second ridge structure, extending a second portion of the conductive film into a central portion of the second rectangular shaped portion of the aperture, in a second direction, the second direction being orthogonal to the first direction.

It is another object of the present invention to provide a method for generating near-field light sources including fashioning an aperture in a conductive film supported on a transparent dielectric material, the aperture having a first ridge structure extending a first portion of the conductive film into the aperture from a first direction, the aperture having a second ridge structure extending a second portion of the conductive film into the aperture from a second direction, the first direction being orthogonal to the second direction. The method further includes illuminating at least a portion of the aperture with light polarized in the first direction to generate a first near-field light source proximate to the end of the first ridge structure and, illuminating at least a portion of the aperture with light polarized in the second direction to generate a second near-field light source proximate to the end of the second ridge structure.

BRIEF DESCRIPTION OF THE DRAWINGS

The present invention will be better understood when consideration is given to the following detailed description thereof. Such description makes reference to the annexed drawings, wherein.

DETAILED DESCRIPTION OF THE PREFERRED EMBODIMENTS

There are a number of applications where it is desirable to have a plurality of near-field light sources, spaced closely together, and independently controllable of each other. Independent control refers to the ability to turn one or more near-field sources on, while others are off. It may also be necessary to vary the intensity ratio between near-field sources, depending on the application. Some applications, such as thermally assisted magnetic recording, require near-field sources of approximately the same intensity, so that different tracks can be written with uniform effect to ensure data integrity. Lithography applications would also require good intensity uniformity between sources, to ensure uniform photo-resist exposure. In yet another application, optical data writing processes which use a light source to write directly to optical media, will benefit from multiple near-field light sources of uniform intensity, to write a plurality of closely spaced data tracks simultaneously. Other applications, such as pump-probes, require that the near-field sources have significantly different intensities. In a pump probe system, the high intensity sources are used to heat the material, while the low intensity sources are used to interrogate at power levels that have a minimal impact on the material. Independent control of the near-field sources also allows the use of different wavelength sources, one for heating, and another variable wavelength source for interrogation. All of the foregoing features are provided by embodiments of the present invention, unavailable previously in the prior art.

Figure 1A:
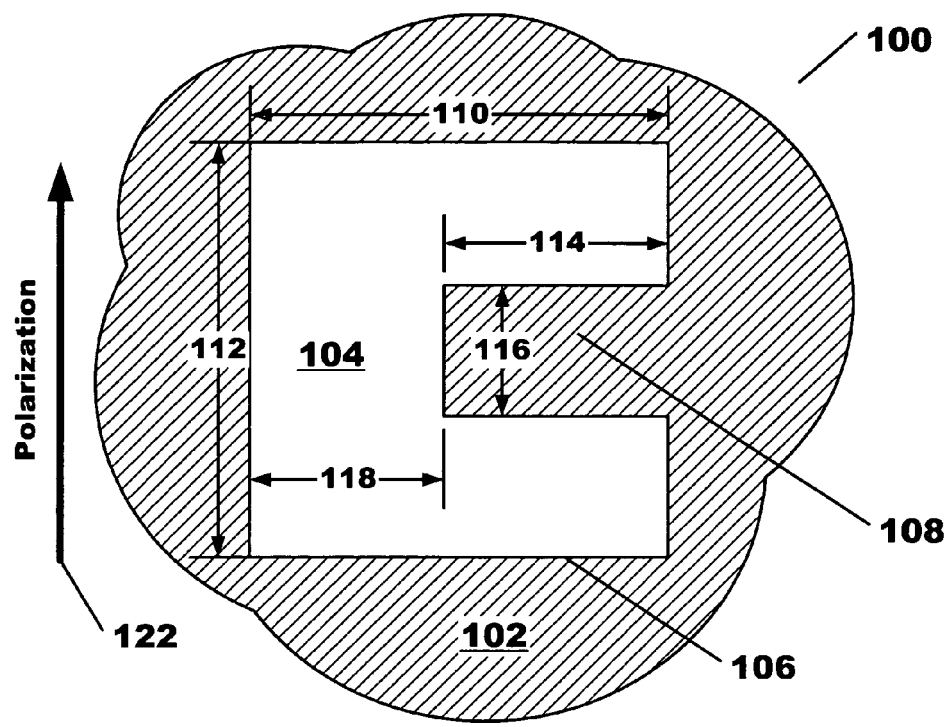
FIGS. 1a, 1b (Prior Art) are schematic plan views of a ridge near-field aperture showing the impact of incident light polarization on the formation of a near-field light source.
Figure 1B:
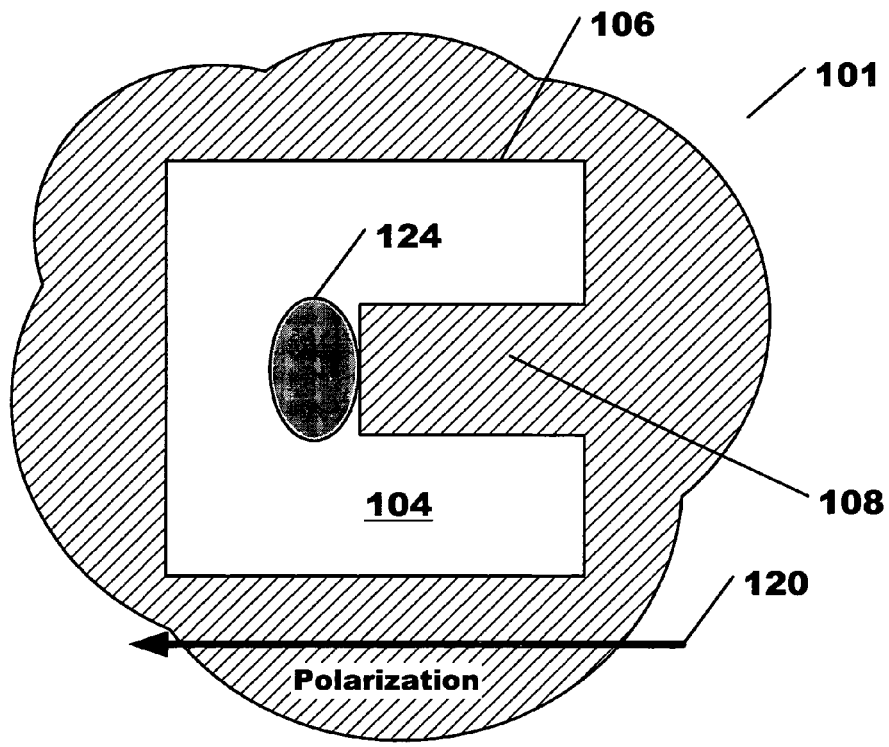

FIGS. 1a, 1b have been discussed previously.

Figure 2A:
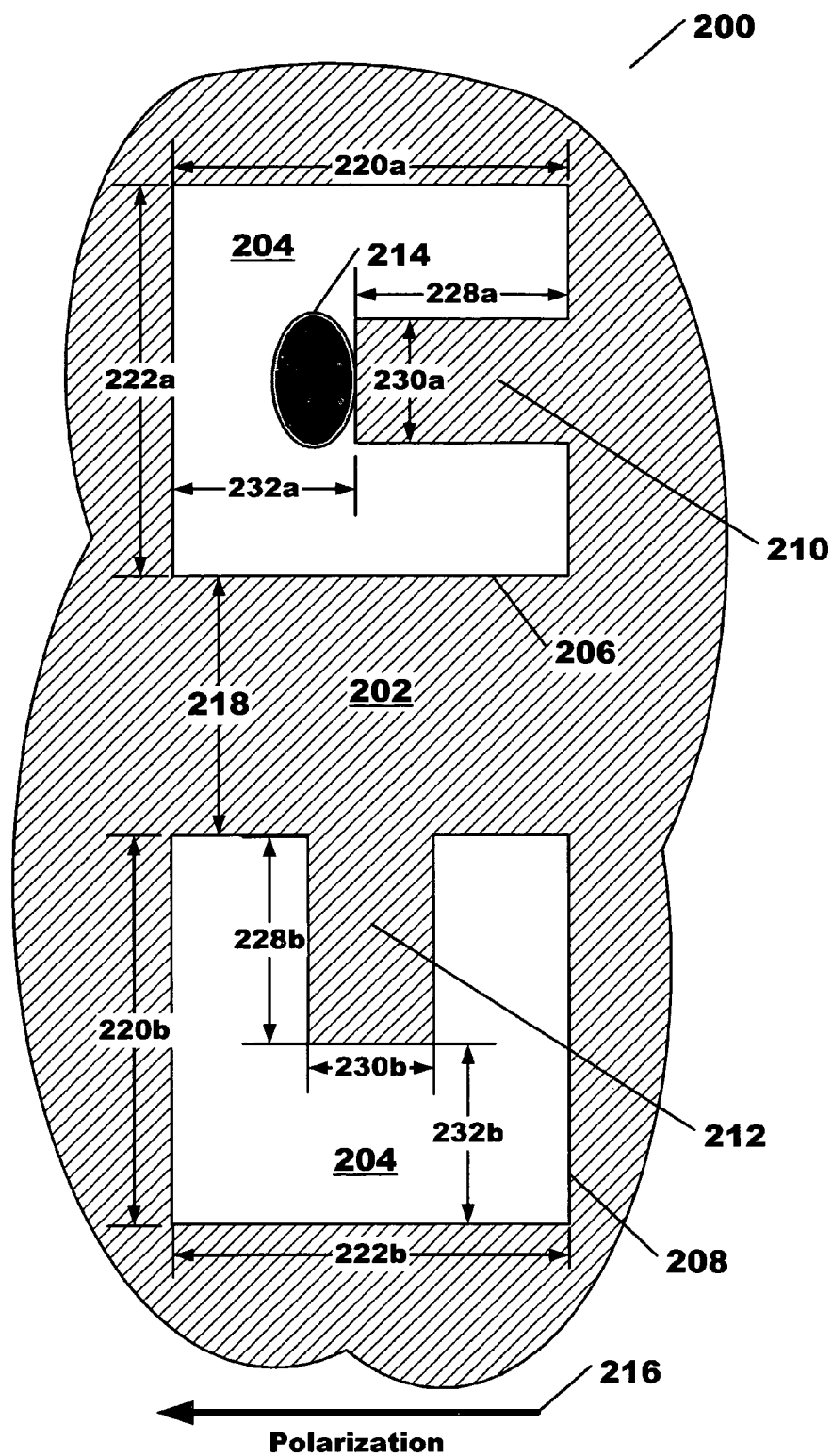
FIGS. 2a, 2b are schematic plan views of two ridge near-field apertures having orthogonally oriented ridges, showing the impact of incident light polarization on the formation of a near-field light sources according to a first embodiment of the present invention.

FIG. 2a is a schematic plan view 200 of two ridge near-field apertures 206, 208 having orthogonally oriented ridges 210, 212 according to a first embodiment of the present invention. For descriptive purposes, near-field apertures 206 and 208 are most easily described as a rectangular aperture (having length 220a or 220b and width 222a or 222b, respectively) in conductive film 202 having protrusions called ridges (210, 212), which extend from the perimeter of the rectangular aperture toward the interior. Ridges 210, 212 are extensions of conductive film 202. The ridges 210 and 212 have lengths 228a, 228b and widths 230a, 230b, respectively. The space between the end of a ridge and perimeter of the aperture opposite to it is known as the gap. The gaps for ridges 210 and 212 are 232a and 232b, respectively. By orthogonally oriented ridges, it is meant that the directions from which the ridges 210, 212 extend into the apertures 206, 208 are normal to each other. When both apertures 206, 208 are illuminated with incident light (not shown) polarized horizontally in the direction of arrow 216, a single near-field light source 214 is produced at the end of ridge 210. Near-field light source 214 is produced through plasmon resonance, which occurs as a result of the polarized incident radiation and the shape of the aperture 206 in conductive film 202. Typically, the wavelength λ of the incident radiation is approximately 10 to 40 times the gaps 232a, 232b or widths 230a, 230b of the aperture. The wavelength for the incident radiation can generally be in the range 200 nm to 2 microns. No near-field light source is produced at the end of ridge 212 in aperture 208 due to the direction of polarization. In this embodiment, the two apertures are separated by a distance 218. The larger the distance 218, the less interaction occurs between the two apertures. That is, they behave like two independent single apertures at large separation distances 218. However, large separations are not desirable if two closely spaced near-field light sources are required, which is usually the case in practice. As distance 218 approaches zero, interactions between the two apertures take place, which can alter the ratio of intensity between the near-field light sources produced in each of the apertures. This may not be desirable in applications where two light sources of equal intensity are required.

Figure 2B:
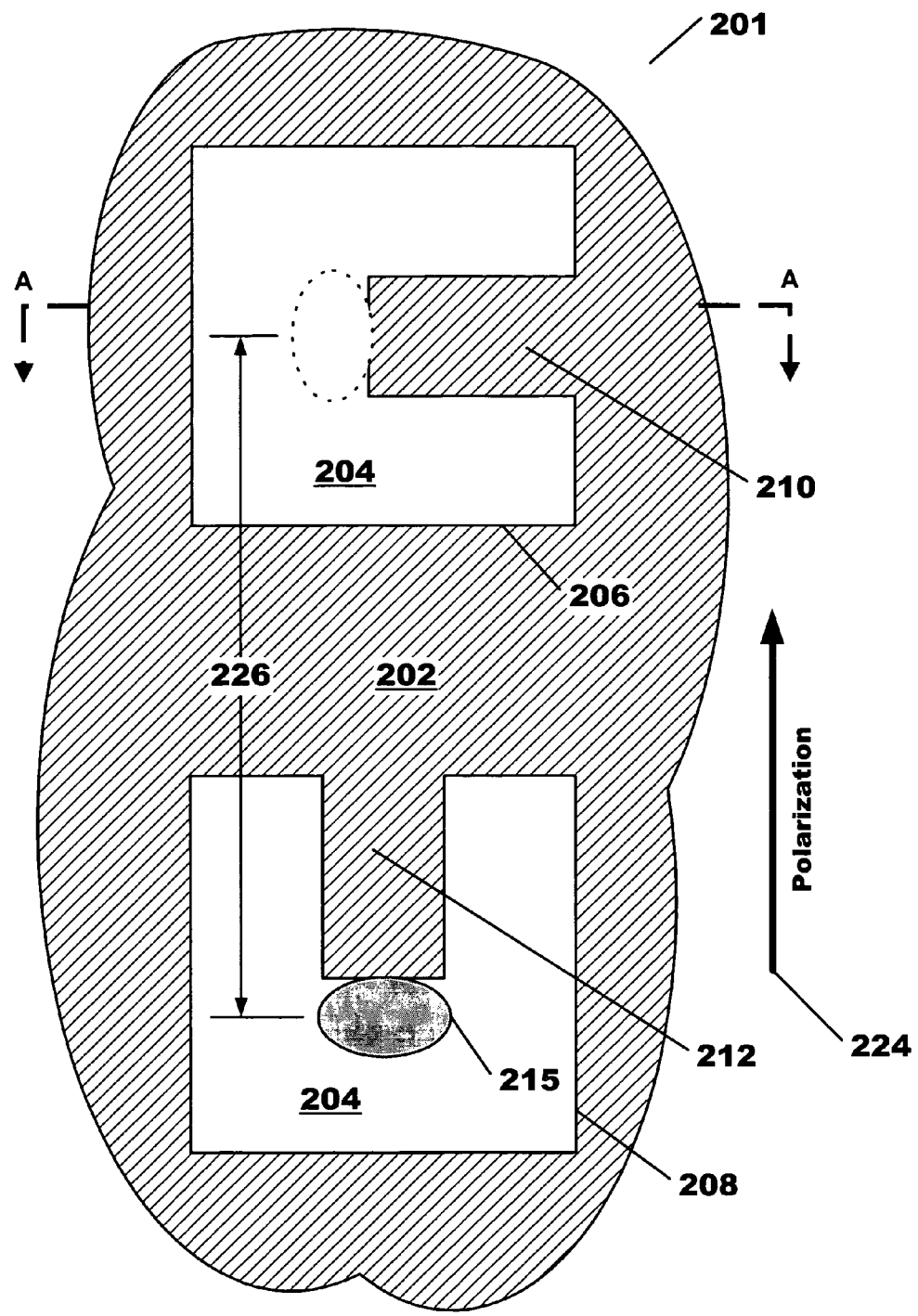

FIG. 2b is a schematic plan view 201 of two ridge near-field apertures 206, 208 of FIG. 2a with the direction of polarization 224 of the incident radiation normal to that shown in FIG. 2a. When both apertures 206, 208 are illuminated with incident light (not shown) polarized vertically in the direction of arrow 224, a single near-field light source 215 is produced at the end of ridge 212. Near-field light source 215 is produced through plasmon resonance, which occurs as a result of the polarized incident radiation and the shape of the aperture 208 in conductive film 202. In this case, no light source 214 is produced in aperture 206. The location where light source 214 would appear is identified by dotted outline. Thus, this embodiment allows for the independent switching of two near-field light sources by altering the direction of polarization of the incident radiation by 90 degrees (or odd multiples of 90 degrees). Different wavelengths may be used to generate each of the two near-field sources 214 and 215, if desired. Due to the separation of the apertures, light sources 214 and 215 are separated by a distance 226. Although this embodiment allows for the switching of two near-field sources using a single incident light source, it may not be as suitable for applications requiring closely spaced near-field sources of balanced intensity. For that requirement, please note the embodiments disclosed below in FIGS. 3-6.

Figure 2C:
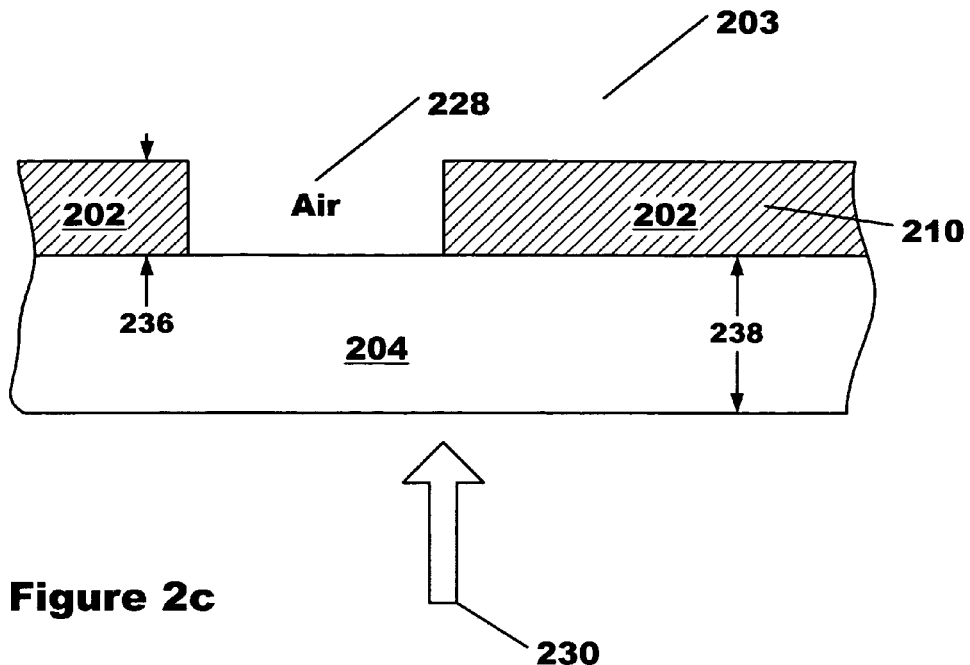
FIGS. 2c, 2d are partial cross sectional views through section A-A of FIG. 2b according to a first embodiment of the present invention.
Figure 2D:
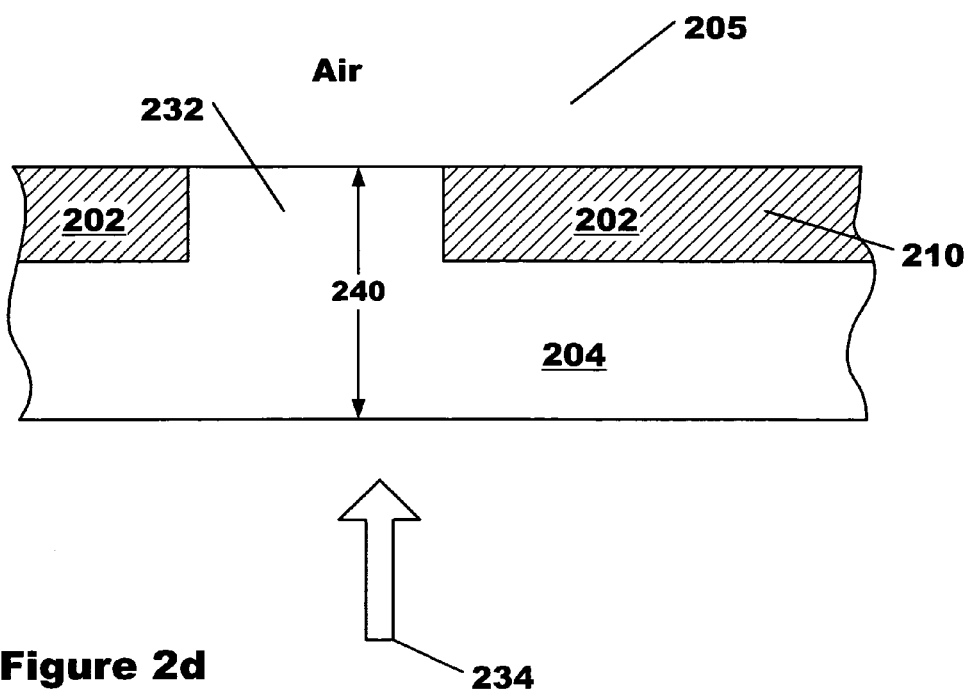

FIGS. 2c, 2d are partial cross sectional views 203, 205 through section A-A of FIG. 2b according to a first embodiment of the present invention. Drawings are not to scale, as some features are exaggerated for clarity. Section A-A is a cross section through ridge 210 and a portion of aperture 206. In one alternative to the first embodiment of the present invention, shown in FIG. 2c, conductive film 202 of thickness 236 resides on the top surface of a transparent dielectric substrate 204 of thickness 238. For the purposes of discussion within this specification, a transparent dielectric is one which transmits at least a portion of an impinging light source at the wavelength of the light source. Such materials may be opaque at one wavelength, but transparent at another wavelength. With respect to embodiments of the present invention, it is important to recognize that the ridge aperture is a three dimensional volume, having a cross sectional area represented by plan views such as FIGS. 2a, 2b (3a,b; 4a,b; 5a,b; 6a,b below), and a depth equal to approximately the thickness of the conductive film defining the aperture. Gap region 228, which is a portion of aperture 206, is filled with air (or the ambient fluid contacting the upper surface of conductive film 202). Typically, incident radiation is directed as shown by arrow 230, and a near-field light source appears in gap region 228 near the end of ridge 210. Incident radiation may also be directed to the top surface of conductive film 202 in a direction opposite to arrow 230 (not shown), but the resulting near-field light source may be considerably different in intensity and location. The embodiment disclosed above in FIG. 2c, while functional, is not preferred for a number of reasons. First, the intensity of the near-field light source may be reduced by air or the ambient environment in the aperture. Second, contaminants such as particles, debris, or organic chemical films present in gap region 228 can severely degrade the quality of the near-field light source. These issues are resolved in another alternative to the first embodiment of the present invention disclosed in FIG. 2d. In this embodiment, region 232 of aperture 206 is filled with the dielectric substrate material 204. This construction eliminates the potential for contamination within the aperture volume and improves the consistency and predictability of the near-field light source. Suitable materials for conductive film 202 are preferably metals, including but not limited to copper, silver, gold, rhodium, platinum, ruthenium, chromium, their mixtures and alloys. More preferably, gold is used. Conductive film thickness 236 can range from 5 nm to 500 nm. Transparent dielectric material 204 includes, but is not limited to silicon dioxide, glass, alumina, silicon nitride, titanium oxides, silicon, and germanium. Transparent polymer materials may also be suitable if they do not present fabrication or thermal problems. The dielectric material may be chosen based on the particular wavelength of the incident radiation and the value of its refractive index. Suitable dielectric materials have a refractive index within the range of 1.4 to 4.0.

Figure 3A:
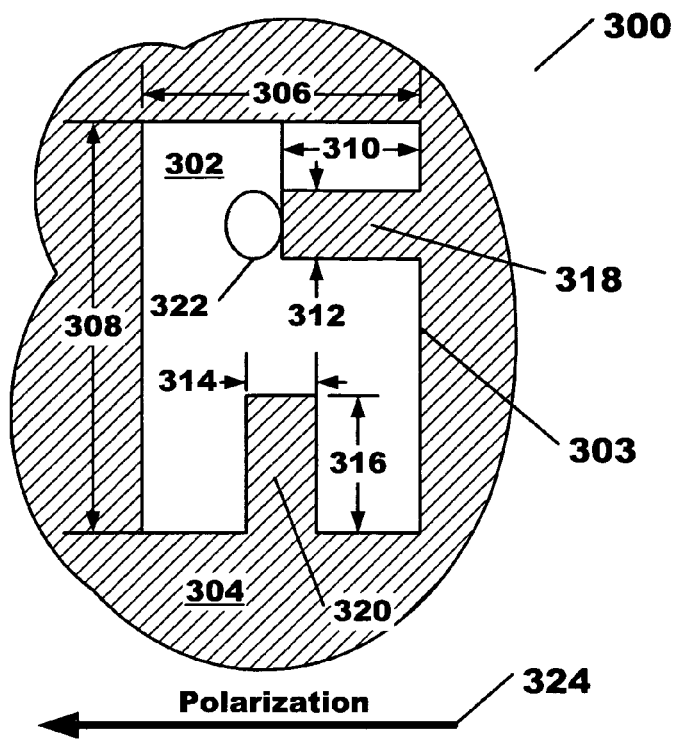
FIGS. 3a, 3b are schematic plan views of a single near-field aperture having two orthoganally oriented ridges, showing the impact of incident light polarization on the formation of a near-field light sources according to a second embodiment of the present invention.

FIG. 3a is schematic plan view 300 of a single near-field aperture 303 having two orthogonally oriented ridge structures 318, 320 according to a second embodiment of the present invention. Aperture 303 can be generally described as a rectangular opening of width 306 and length 308 in conductive film 304, having a first ridge structure 318 of length 310 and width 312 extending horizontally into aperture 303, and a second ridge structure 320 of length 316 and width 314 extending vertically into aperture 303. When incident light (not shown) polarized in the direction of arrow 324 illuminates aperture 303, a near-field source 322 is formed at the end of ridge 318.

Figure 3B:
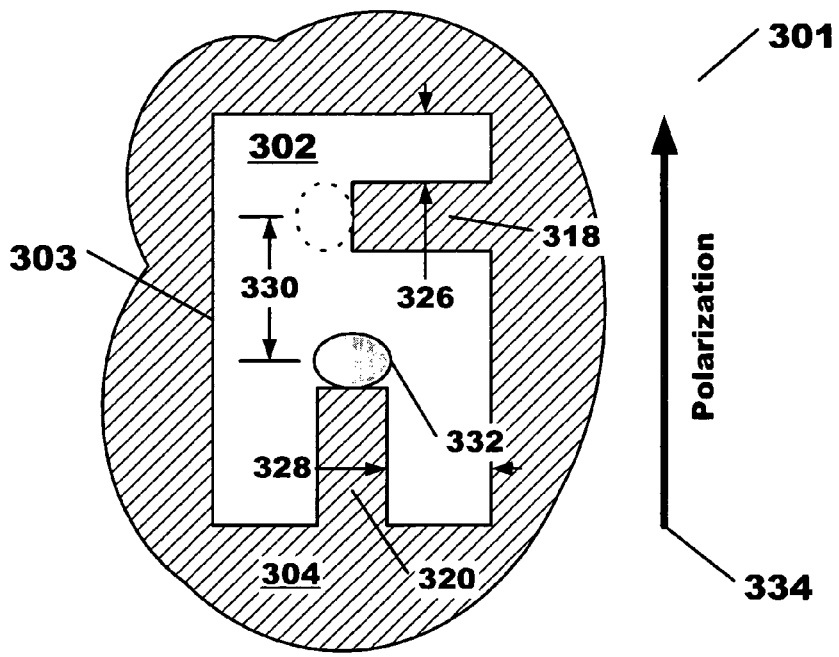

FIG. 3b is a schematic plan view 301 of near-field aperture 303 wherein the incident illumination (not shown) is polarized in the direction of arrow 334 in accordance with a second embodiment of the present invention. In this case, a single near-field source 332 is generated at the end of ridge 320. The light source 322 which appeared at the end of ridge 318 is no longer present. The location at which light source 322 appeared is indicated by the dotted outline. This embodiment overcomes a major shortcoming of the embodiment disclosed in FIGS. 2a,b, in that the distance 330 between sources 322 and 332 is much shorter than the distance 226 between near-field sources generated in two separated apertures of FIG. 2b. This allows writing to, closely spaced data tracks for data storage applications, or exposure of closely spaced features in lithography applications. This embodiment provides for independent control of near-field sources 332 and 322 via control of the polarization direction of the incident radiation, as illustrated in FIGS. 3a and 3b.

A partial cross sectional view of aperture 303 is not shown, but would be similar to those presented in FIGS. 2c and 2d for a cross section through ridge 318, for example. Aperture 303 may contain air or the ambient atmosphere (as shown in FIG. 2c), or preferably a transparent dielectric material as shown in FIG. 2d. Suitable materials and thickness for conductive film 304 are the same as disclosed above for conductive film 202. Limitations for transparent dielectric material 302 are similar to those disclosed above for dielectric material 204. The dielectric material may be chosen based on the particular wavelength of the incident radiation and the value of its refractive index, and may be different from that chosen for the embodiments of FIGS. 2a-d. Suitable dielectric materials have a refractive index within the range of 1.4 to 4.0. The wavelength λ of the incident radiation may range from about 200 nm to 2.0 microns. Different wavelengths may be used to generate each of the two near-field sources 322 and 332, if desired. Length 308 and width 306 can range from 30 nm to 1000 nm. Ridge lengths 310 and 316 can range from 5 nm to 1000 nm. Ridge widths 312 and 314 can range from 5 nm to 300 nm. It should be recognized that the dimensions of the ridges (length and width) in comparison with the overall length 308 and width 306 of aperture 303, can significantly influence the relative intensities of near-field sources 322 and 332. Although aperture 303 appears to be the geometric addition of apertures 206 and 208, near-field sources 322 and 332 will not have the same relative intensities of sources 214 and 215. Other variables that will affect the relative intensities of sources 322 and 332 include incident light wavelength, thickness and composition of conductive film 304, and composition of transparent dielectric 302. Please refer to FIGS. 5-8 below for specific examples.

Figure 4A:
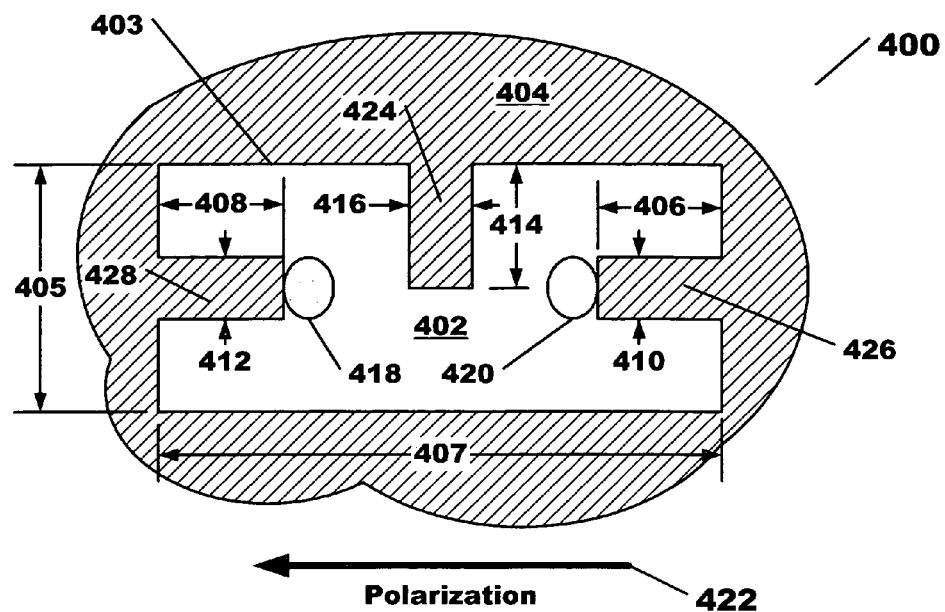
FIGS. 4a, 4b are schematic plan views of a single near-field aperture having three ridges, showing the impact of incident light polarization on the formation of a near-field light sources according to a third embodiment of the present invention.
Figure 4B:
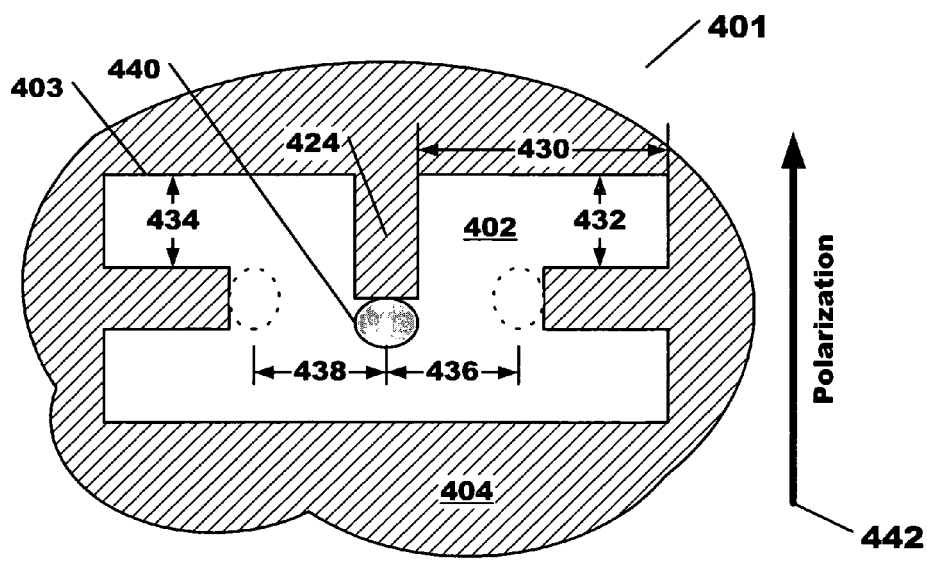

FIGS. 4a, 4b are schematic plan views 400, 401 of a single near-field aperture 403 having three ridge structures 424, 426, and 428, showing the impact of incident light polarization on the formation of three near-field light sources 418, 420, and 440, according to a third embodiment of the present invention. In this embodiment, two near-field sources are on while the third is off, or vise versa. Aperture 403 can be generally described as a rectangular opening of width 405 and length 407 in conductive film 404, having a first ridge structure 426 of length 406 and width 410 extending horizontally into aperture 403, a second ridge structure 424 of length 414 and width 416 extending vertically into aperture 403, and a third ridge structure 428 of length 408 and width 412 extending horizontally into aperture 403 in a direction opposing ridge 426. Ridge structure 424 is oriented orthogonal to ridge structures 426 and 428. When incident light (not shown) polarized in the direction of arrow 422 in FIG. 4a illuminates aperture 403, two near-field sources 418, 420 are simultaneously formed at the end of ridges 428 and 426, respectively. When incident light (not shown) polarized in the direction of arrow 442 in FIG. 4b illuminates aperture 403, a single near-field source 440 is formed at the end of ridge 424. In this configuration light sources 418 and 420 are no longer present. Their locations are indicated by dotted outlines. Near-field source 440 is separated by a distance 438 from near-field source 418, and by distance 436 from near-field source 420. Distances 438 and 436 may or may not be equal. Variables such as the relative dimensions, incident light wavelength, thickness and composition of conductive film 404, and composition of transparent dielectric 402, determine the relative intensities of near-field sources 418, 420, and 440.

A partial cross sectional view of aperture 403 is not shown, but would be similar to those presented in FIGS. 2c and 2d for a cross section through ridge 424, for example. Aperture 403 may contain air or the ambient atmosphere (as shown in FIG. 2c), or preferably a transparent dielectric material as shown in FIG. 2d. Suitable materials and thickness for conductive film 404 are the same as disclosed above for conductive film 202. Limitations for transparent dielectric material 402 are similar to those disclosed above for dielectric material 204. The dielectric material may be chosen based on the particular wavelength of the incident radiation and the value of its refractive index, and may be different from that chosen for the embodiments of FIGS. 2a-d. Suitable dielectric materials have a refractive index within the range of 1.4 to 4.0. The wavelength λ of the incident radiation may range from about 200 nm to 2.0 microns. Length 407 and width 405 can range from 30 nm to 1000 nm. Ridge lengths 406, 408 and 414 can range from 5 nm to 1000 nm. Ridge widths 410, 412 and 416 can range from 5 nm to 300 nm.

Figure 5A:
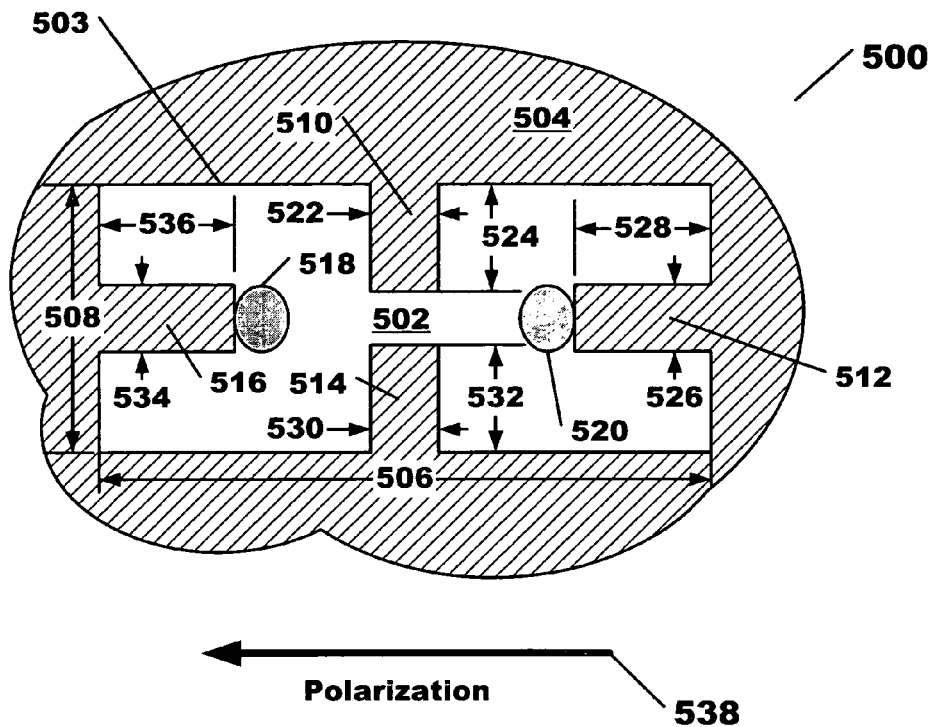
FIGS. 5a, 5b, are schematic plan views of a single near-field aperture having four ridges, showing the impact of incident light polarization on the formation of a near-field light sources according to a fourth embodiment of the present invention.
Figure 5B:
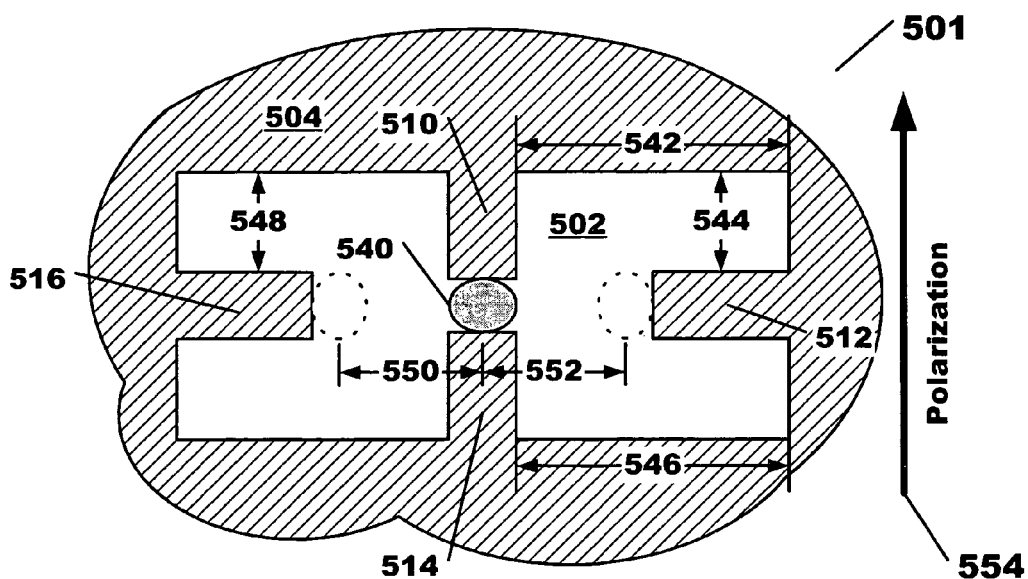

FIGS. 5a, 5b, are schematic plan views 500, 501 of a single near-field aperture 503 having four ridge structures 510, 512, 514, and 516, showing the impact of incident light polarization on the formation of near-field light sources 518, 520, and 540, according to a fourth embodiment of the present invention. Aperture 503 can be generally described as a rectangular opening of width 508 and length 506 in conductive film 504, having two pairs of opposing ridge structures. A first pair comprises ridge structure 512 of width 526 and length 528, and ridge structure 516 of width 534 and length 536, which extend horizontally into aperture 503 from opposing directions. A second pair comprises ridge structure 510 of width 522 and length 524, and ridge structure 514 of width 530 and length 532, which extend vertically into aperture 503 from opposing directions. Ridge structures 512 and 516 are oriented orthogonal to ridge structures 510 and 514. When incident light (not shown) polarized in the direction of arrow 538 in FIG. 5a illuminates aperture 503, two near-field sources 518, 520 are simultaneously formed at the end of ridges 516 and 512, respectively. When incident light (not shown) polarized in the direction of arrow 554 in FIG. 5b illuminates aperture 503, a single near-field source 540 is formed between ridges 510 and 514, if the ends of ridges 510 and 514 are proximate to each other (shown). In an alternative embodiment of the present invention, where ridges 510 and 514 have shorter lengths, two separate near-field sources can be created, one at each end of ridge 510 and 514, respectively (not shown). Ridge structure 516 is offset from the upper edge of aperture 503 by a distance 548. Ridge structure 512 is offset from the upper edge of aperture 503 by a distance 544. Distances 548 and 544 may or may not be equal, but preferably are approximately equal. Ridge structure 510 is offset from the right edge of aperture 503 by a distance 542. Ridge structure 514 is offset from the right edge of aperture 503 by a distance 546. Distances 542 and 546 may or may not be equal for the alternative embodiment having four near-field sources. For the embodiments shown in FIGS. 5a and 5b, distances 542 and 546 are approximately equal. Near-field source 540 is separated by a distance 550 from near-field source 518, and by distance 552 from near-field source 520. Distances 550 and 552 may or may not be equal. Variables such as the relative dimensions, incident light wavelength, thickness and composition of conductive film 504, and composition of transparent dielectric 502, determine the relative intensities and locations of near-field sources 518, 520, and 540.

A partial cross sectional view of aperture 503 is not shown, but would be similar to those presented in FIGS. 2c and 2d for a cross section through ridges 510 and 514, for example. Aperture 503 may contain air or the ambient atmosphere (as shown in FIG. 2c), or preferably a transparent dielectric material as shown in FIG. 2d. Suitable materials and thickness for conductive film 504 are the same as disclosed above for conductive film 202. Limitations for transparent dielectric material 502 are similar to those disclosed above for dielectric material 204. The dielectric material may be chosen based on the particular wavelength of the incident radiation and the value of its refractive index, and may be different from that chosen for the embodiments of FIGS. 2a-d. Suitable dielectric materials have a refractive index within the range of 1.4 to 4.0. The wavelength λ of the incident radiation may range from about 200 nm to 2.0 microns. Different wavelengths may be used to generate near-field sources 518, 520 and 540, if desired. Length 506 and width 508 can range from 30 nm to 1000 nm. Ridge lengths 528, 53.6, 524 and 532 can range from 5 nm to 1000 nm. Ridge widths 522, 526, 530 and 534 can range from 5 nm to 300 nm.

Figure 6A:
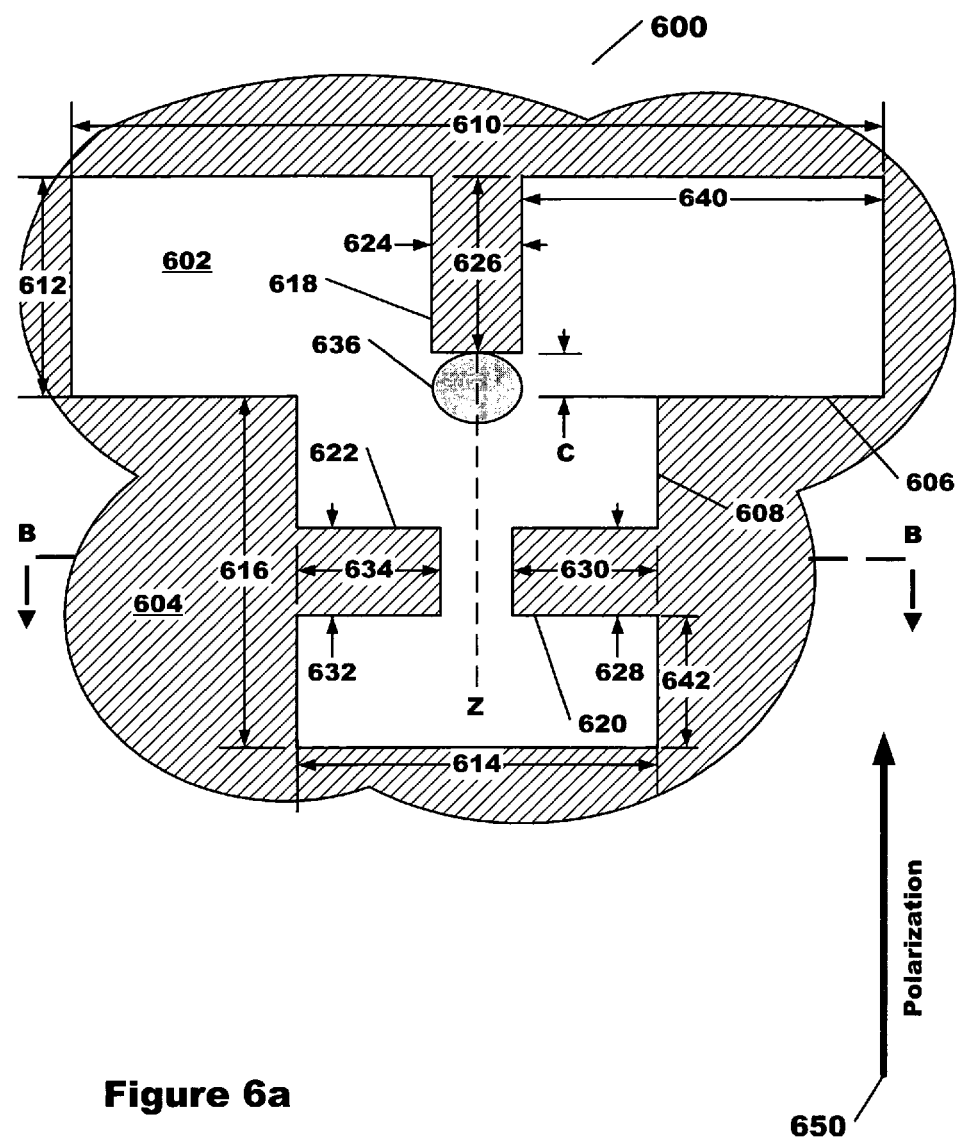
FIGS. 6a, 6b is a schematic plan views of a "T" shaped near-field aperture having three ridges, showing the impact of incident light polarization on the formation of near-field light sources according to a preferred embodiment of the present invention.
Figure 6B:
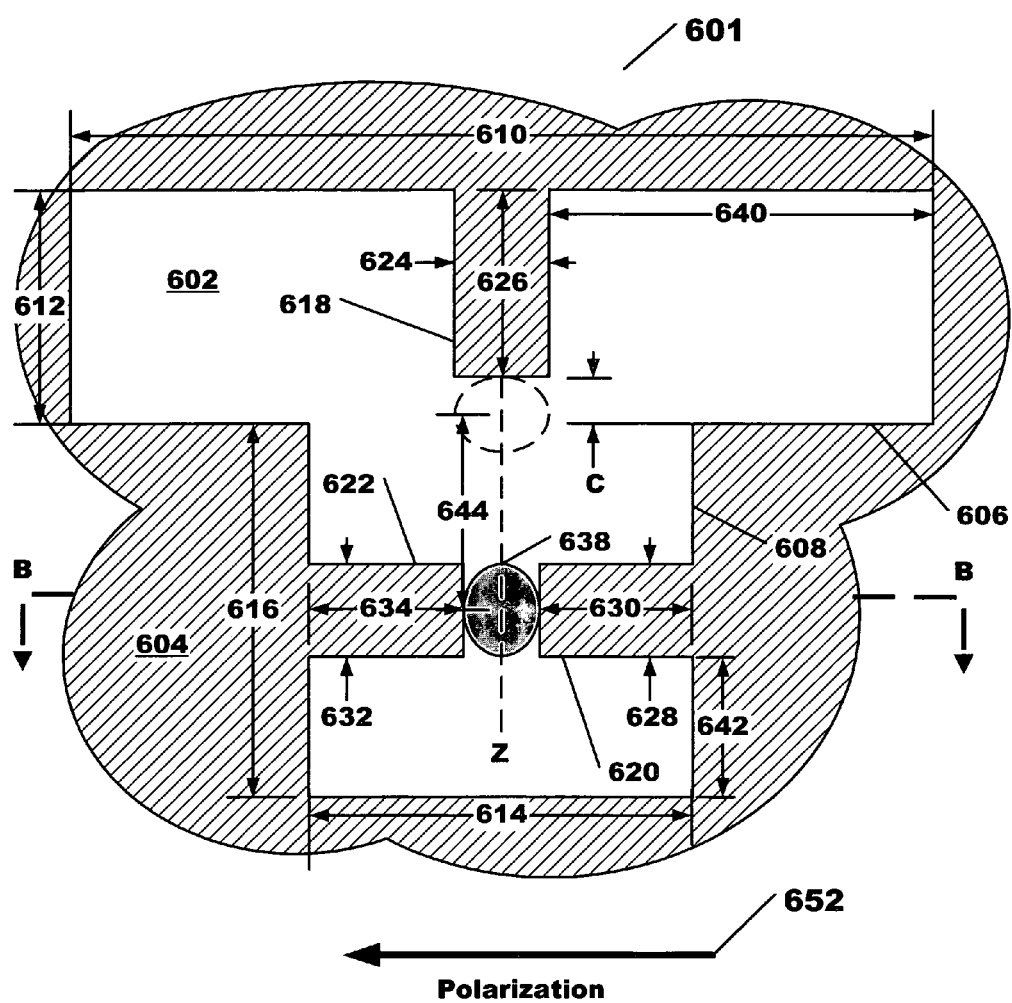

FIGS. 6a, 6b are schematic plan views 600, 601 of a "T" shaped near-field aperture in conductive film 604 having three ridge structures 618, 620, and 622, showing the impact of incident light polarization on the formation of near-field light sources 636 and 638, according to preferred embodiments of the present invention. The "T" shaped aperture comprises two adjacent, rectangular shaped portions 606 and 608. A first rectangular portion 606, the upper section of the "T", has a length 612 and a width 610. Ridge structure 618, having a width 624 and length 626, extends vertically into aperture 606 normal to the upper boundary of "T" section 606, and is placed at a distance 640 from the right boundary of aperture 606. A second rectangular portion 608 forms the lower component of the "T" shaped aperture, having a length 616 and width 614. Width 614 of portion 608 is less than width 610 of portion 606. Ridge structures 620 and 622 extend horizontally into aperture portion 608 from opposing directions, orthogonal to ridge structure 618. Ridge structure 620 has a width 628 and length 630. Ridge structure 622 has a length 634 and width 632. When the incident light (not shown) polarized in a vertical direction parallel to Z axis, as indicated by arrow 650, illuminates the entire "T" shaped aperture, a near-field light source 636 is formed near the end of ridge 618 and is indicated in FIG. 6a. No light source is formed near ridges 620 and 622.

For ridges 620 and 622 having sufficient lengths, a single near-field source 638 is produced between the ends of ridges 620, 622 when the "T" aperture is illuminated with incident radiation polarized in a horizontal direction as indicated by arrow 652 in FIG. 6b. In this configuration, the light source 636 is no longer present. Where it was located is now indicated by dotted outline. This geometry is preferred because it yields a single light source of the highest intensity. Alternatively, shorter ridges (lower values of lengths 630, 634) can produce two near-field sources (not shown), one at each end of ridges 620 and 622. One advantage of the "T" shaped aperture is that the near-field sources 636 and 638 are produced relatively close together, with a center to center spacing 644 suitable for high density data recording applications and high resolution lithography applications. Another advantage of this embodiment is that by adjusting dimension C, which is the length 612 of the upper portion of the "T" aperture minus the length 626 of ridge 624, (or the distance between the end of ridge structure 618 and the imaginary boundary common to the two adjacent, rectangularly shaped portions 606 and 608), the relative intensities between near-field sources 636 and 638 can be adjusted. For applications requiring balanced intensities, this feature is essential. Other variables such as the incident light wavelength, thickness and composition of conductive film 604, and composition of transparent dielectric 602, may also impact the relative intensities of near-field sources 636 and 638. The "T" aperture maintains the capability to selectively turn on each near-field source based upon the direction of polarization of the incident radiation. The wavelength λ of the incident radiation may range from about 200 nm to 2.0 microns. Different wavelengths may be used to generate near-field sources 636 and 638, if desired. The overall height of the "T" aperture, which is the sum of dimensions 612 and 616, can range from 30 nm to 1000 nm. The width of the upper section of the "T" aperture 610, can range from 30 nm to 1000 nm. Ridge lengths 626, 630 and 634 can range from 5 nm to 500 nm. Ridge widths 632, 628 and 624 can range from 5 nm to 300 nm.

Figure 6C:
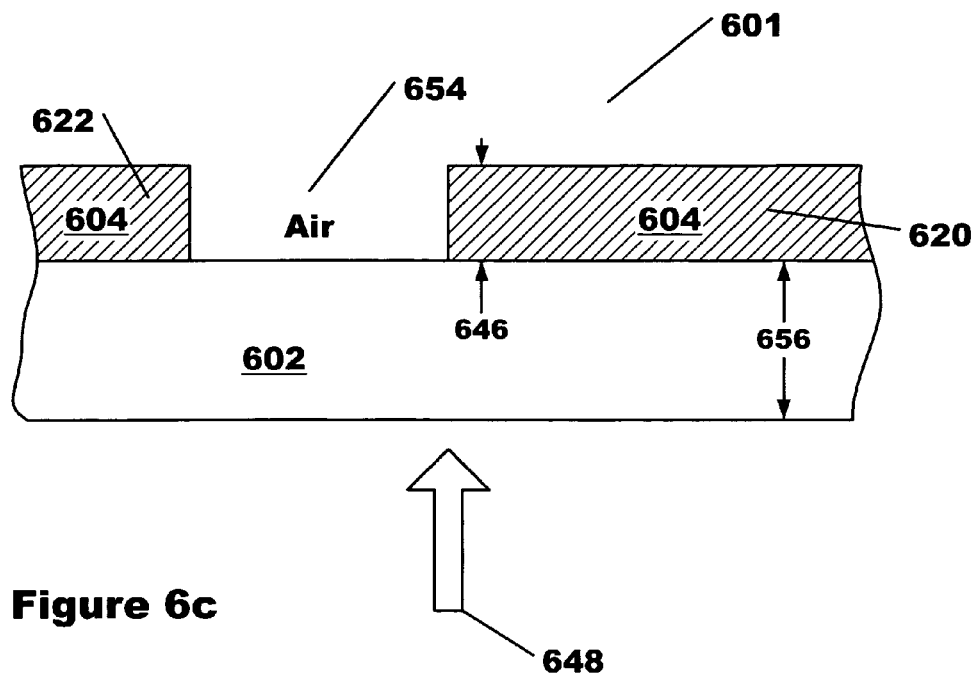
FIGS. 6c, 6d are partial cross sectional views through section B-B of FIG. 6a according to a preferred embodiment of the present invention.
Figure 6D:
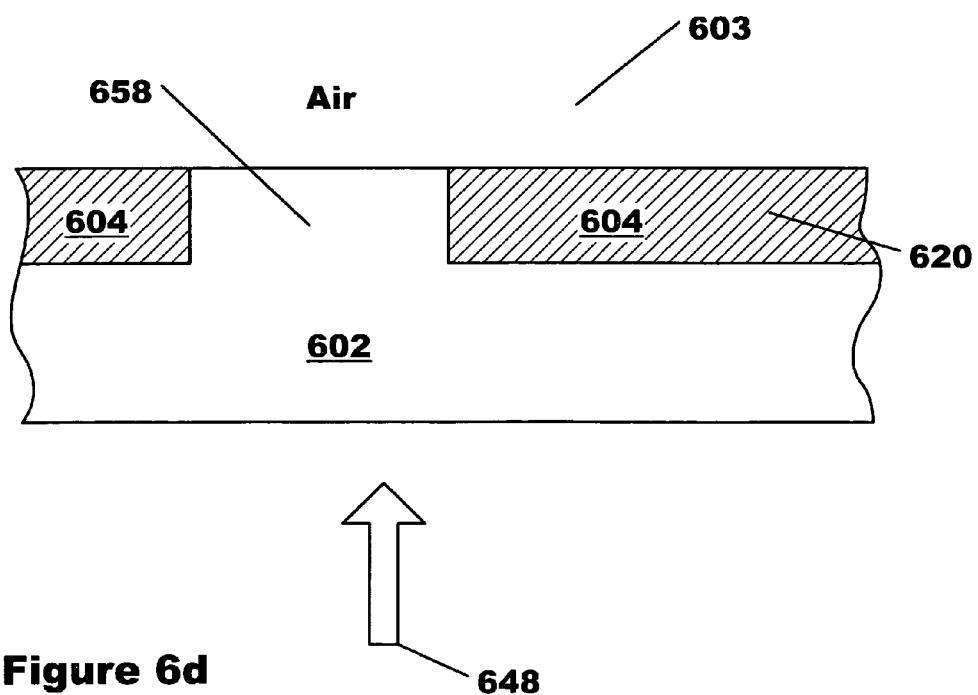

FIGS. 6c, 6d are partial cross sectional views 601, 603 through section B-B of FIGS. 6a, 6b according to a preferred embodiment of the present invention. Drawings are not to scale, as some features are exaggerated for clarity. Section B-B is a cross section through ridges 630, 634 and a portion of aperture 608. In one alternative preferred embodiment, shown in FIG. 6c, conductive film 604 resides on the top surface of a transparent dielectric substrate 602 of thickness 656. Gap region 654 in FIG. 6c is filled with air (or the ambient fluid contacting the upper surface of conductive film 202). In another alternative preferred embodiment, gap region 658 in FIG. 6d is filled with transparent dielectric 602. The embodiment shown in FIG. 6d is preferred for reasons disclosed previously. As disclosed in foregoing embodiments of the present invention, incident radiation (not shown) preferably illuminates the "T" shaped aperture from direction of arrow 648, that is, through transparent dielectric 602. The embodiment shown in FIG. 6d is preferred to prevent contamination within the aperture volume and provide consistent optical properties for the formation of the near-field sources. Suitable materials and thickness for conductive film 604 are the same as disclosed above for conductive film 202. Limitations for transparent dielectric material 602 are similar to those disclosed above for dielectric material 204. The dielectric material may be chosen based on the particular wavelength of the incident radiation and the value of its refractive index, and may be different from that chosen for the embodiments of FIGS. 2a-d. Suitable dielectric materials have refractive index within the range of 1.4 to 4.0.

EXAMPLES

The following examples are meant to illustrate specific conditions encompassed by embodiments of the present invention, and are by no means meant to limit the scope of the invention.

Example 1

The aperture 503 of FIG. 5a, b having a length 506 of about 320 nm and a width 508 of about 130 nm was illuminated with polarized light of wavelength=1 micron. Note that both length 506 and width 508 are smaller than the incident wavelength. Conductive film 504 was about 25 nm thick and was composed of gold metal. Transparent dielectric 502 was quartz, refractive index of 1.5, which filled the aperture volume as shown in FIG. 2d. Ridge structures 510, 512, 514, and 516 were each about 55 nm long and 20 nm wide. Vertically polarized (FIG. 5b) incident radiation of 1 micron wavelength, directed to the dielectric film side as shown in FIG. 2b, produced a near-field source 540 having a peak intensity of 102 relative units, measured in a plane about 13 nm above the gold film in air. Relative intensity units express the ratio of the near filed light source intensity normalized to that of the incident radiation. For example, a near-field light source of 100 relative units is 100 times the intensity of the incident radiation. The peak intensity is the maximum intensity level produced by the near-field light source, when measuring light intensity as a function of position within the near-field source. See, for example FIGS. 7a-b, 8a-b below. Horizontally polarized (FIG. 5a) incident radiation of 1 micron wavelength produced two near-field sources 518, 520 having peak intensities of 4.3 relative units, measured in a plane about 13 nm above the gold film in air. Near-field sources 518, 520 were about 30 nm in diameter and about 190 nm apart. Near-field source 540 was about 30 nm in diameter, and was about 95 nm from either of the two other sources (i.e., dimension 550=dimension 552=about 95 nm). The ratio of the peak intensity values of the vertically polarized radiation to the horizontally polarized radiation was 23.7, indicating a substantial difference in the intensities of the near-field sources created by the two polarization directions. This example affirms that aperture structure 503 can provide independently controlled near-field light sources which can be greater in intensity than the input, and are separated by a subwavelength distance within tens of nanometers from each other.

Example 2

The "T" shaped aperture of FIG. 6a was illuminated with polarized incident radiation having a wavelength of 1 micron. The aperture had the following dimensions: dimension 612=about 39 nm; C=about 15 nm; dimension 610=about 116 nm; dimension 616=about 63 nm; and, dimension 614=about 52 nm. Ridge structure 618 had length (626)=about 24 nm and width (624)=about 20 nm. Ridge structures 620 and 622 were each about 16 nm in length (dimensions 630, 634, respectively), and about 20 nm in width (dimensions 628, 632, respectively). Dimension 640=about 48 nm, placing ridge 618 at the midpoint of width 610. Dimension 642=about 21.5 nm. Conductive film 604 was about 50 nm thick and was composed of gold metal. Transparent dielectric 602 was quartz, refractive index of 1.5, which filled the aperture volume as shown in FIG. 6d. Vertically polarized incident radiation (as shown in FIGS. 6a and 6d) of 1 micron wavelength produced a near-field source 636 having a peak intensity about 79.5 relative units, measured in a plane about 13 nm above the gold film in air. Horizontally polarized incident radiation (as shown in FIGS. 6b and 6d) of 1 micron wavelength produced near-field source 638 having a peak intensity of 59.3 relative units, measured in a plane about 13 nm above the gold film in air. These results are shown graphically in FIGS. 7a and 7b.

Figure 7A:
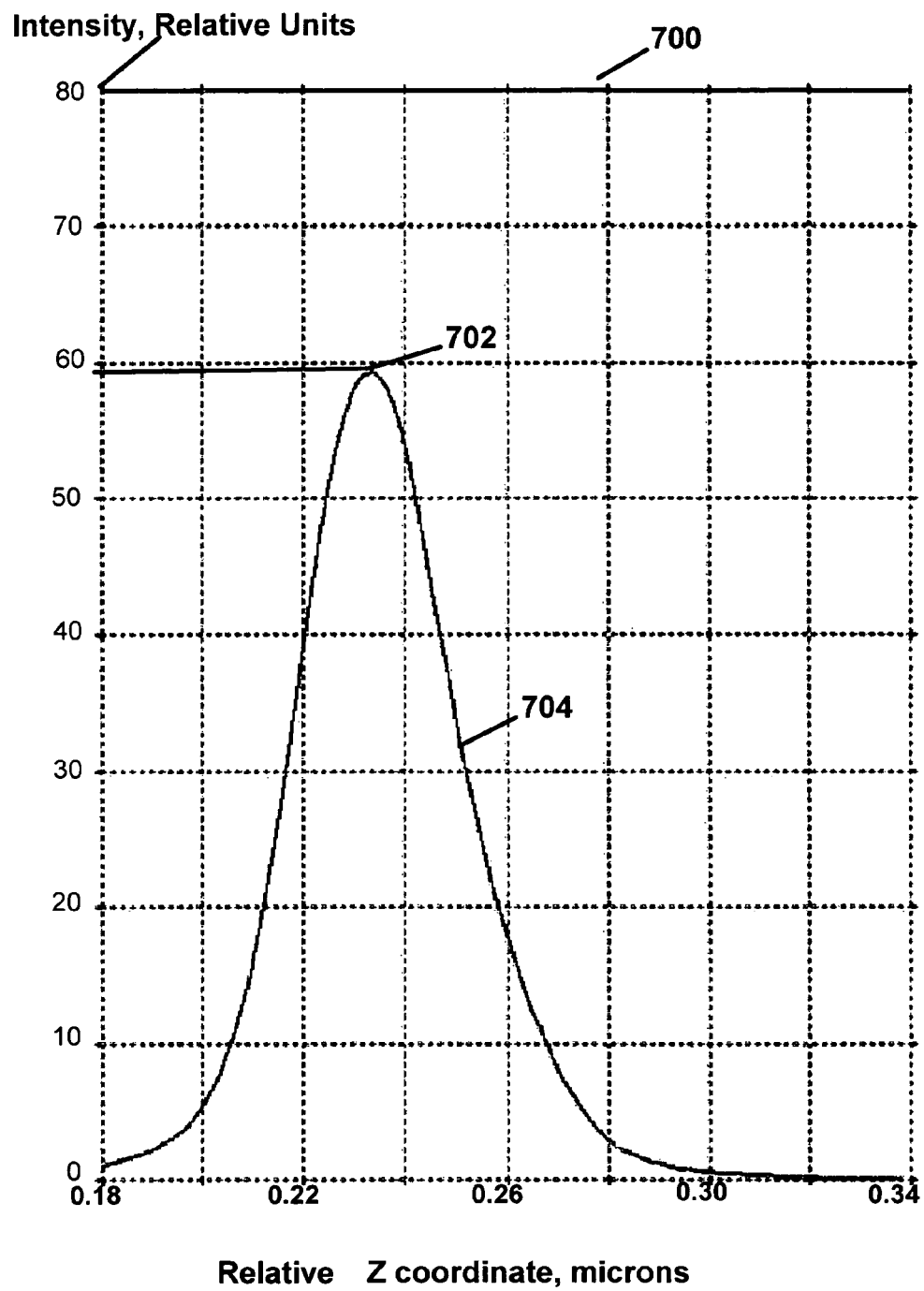
FIGS. 7a, 7b are charts of intensity versus position for a near-field light source along the Z axis of FIGS. 6a, 6b for non-optimized ridge parameters, according to an embodiment of the present invention; and, FIGS. 8a, 8b are charts of intensity versus position for a near-field light source along the Z axis of FIGS. 6a, 6b for optimized ridge parameters, according to a preferred embodiment of the present invention.

FIG. 7a is a plot 700 of intensity versus position 704 measured along the Z axis for near-field source 638. Polarization was horizontal as shown in FIG. 6b. The maximum, or peak value 702 of intensity was about 59.3 relative units.

Figure 7B:
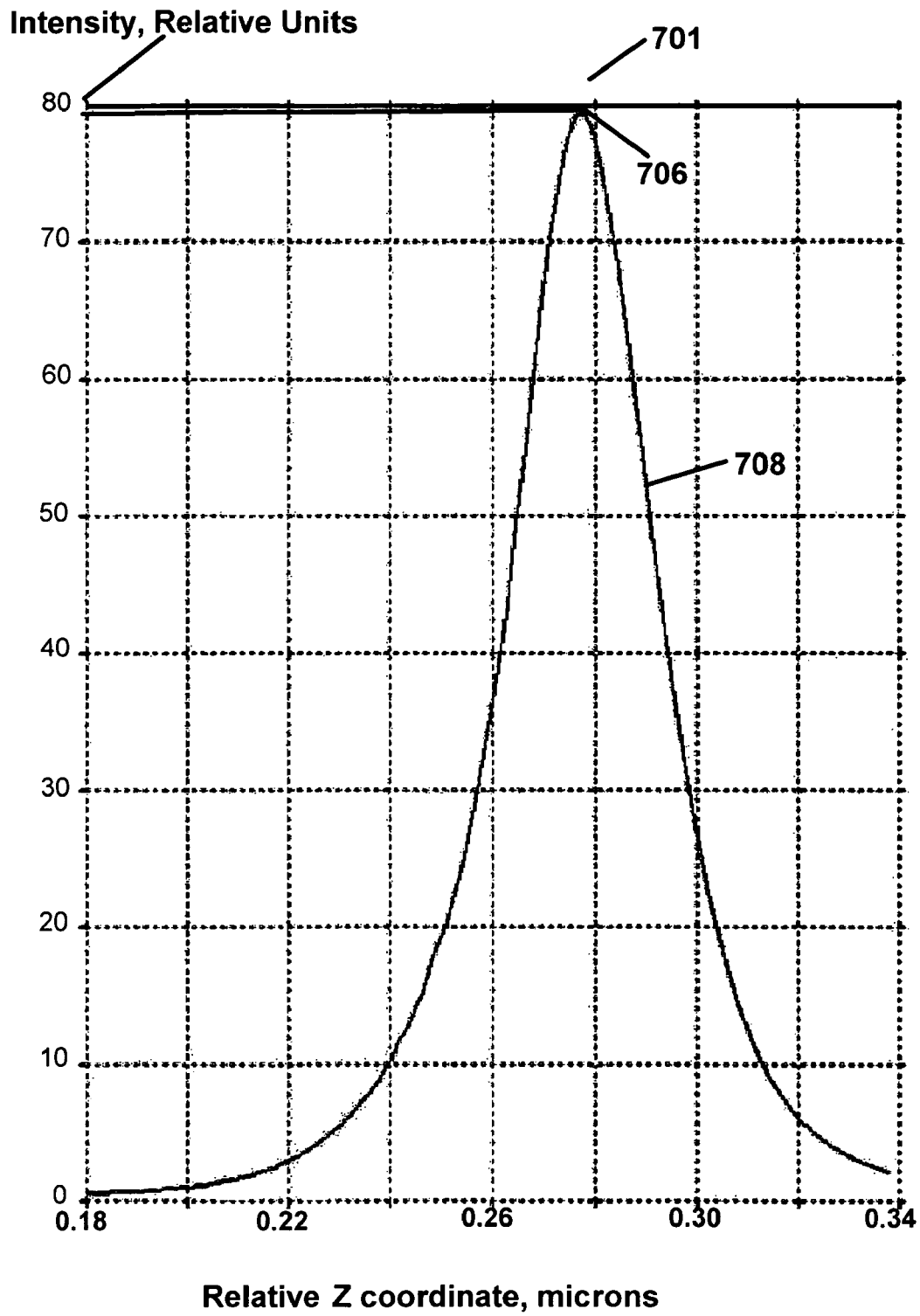

FIG. 7b is a plot 701 of intensity versus position 708 measured along the Z axis for near-field source 636. Polarization was vertical as shown in FIG. 6a. The maximum, or peak value 706 of intensity was about 79.5 relative units. The ratio of near-field source 638 peak intensity to near-field source 636 peak intensity was 0.75, indicating a moderate brightness difference between near-field sources 636 and 638. The distance 644 between the centers of near-field sources 636 and 638 as measured from FIGS. 7a and 7b is about 46 nm, which coincides with the geometry shown in FIGS. 6a, 6b. For both polarizations, the width of the light source at high intensity maximum as shown in FIG. 7a, 7b is about 33 nm, placing both of them in the regime of subwavelength resolution. This example also affirms that a T-shaped aperture structure as illustrated in FIG. 6a, 6b can provide independently controlled near-field light sources which are greater in intensity than the input and are separated by a subwavelength distance, within tens of nanometers from each other.

Example 3

Figure 8A:
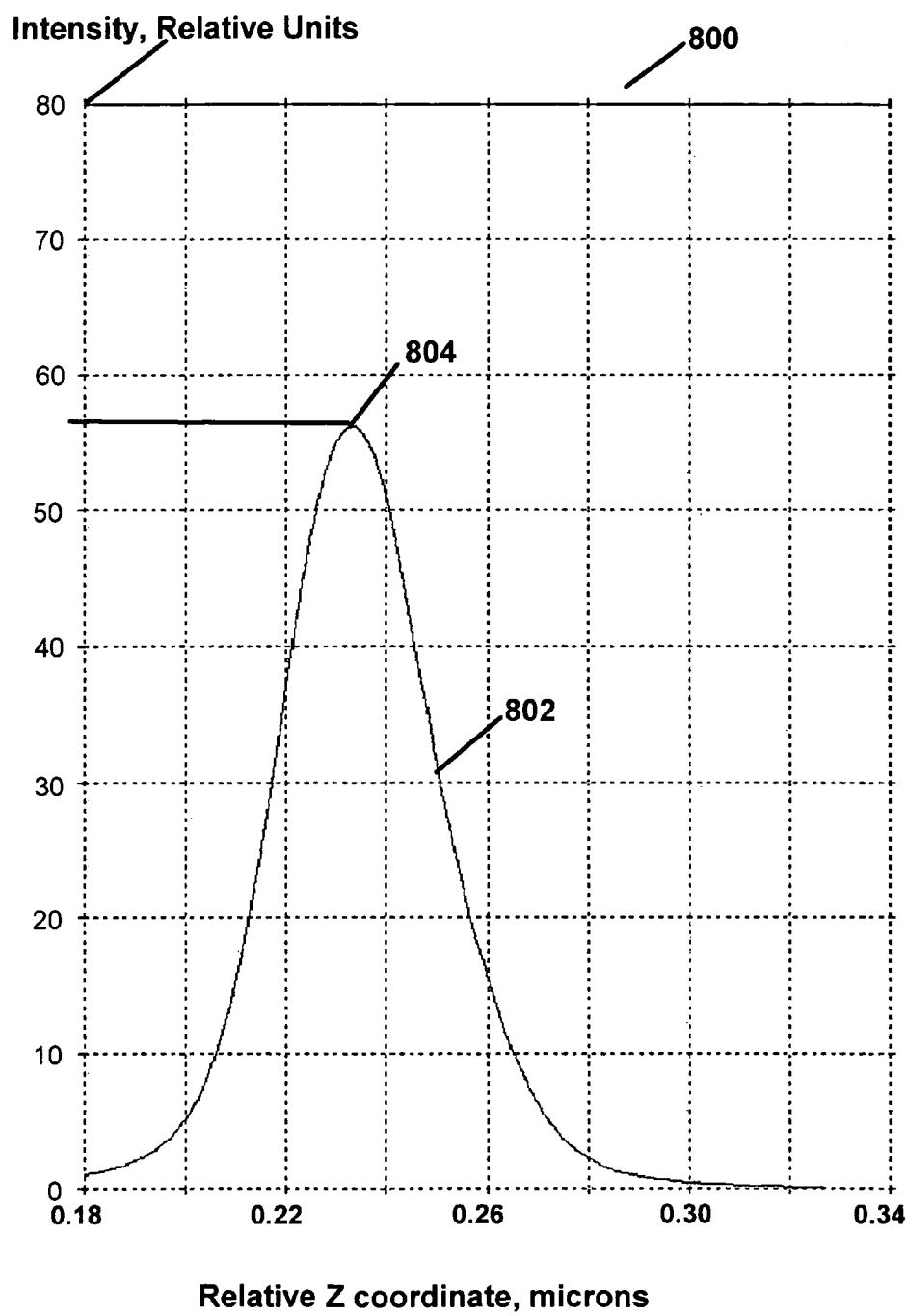
Figure 8B:
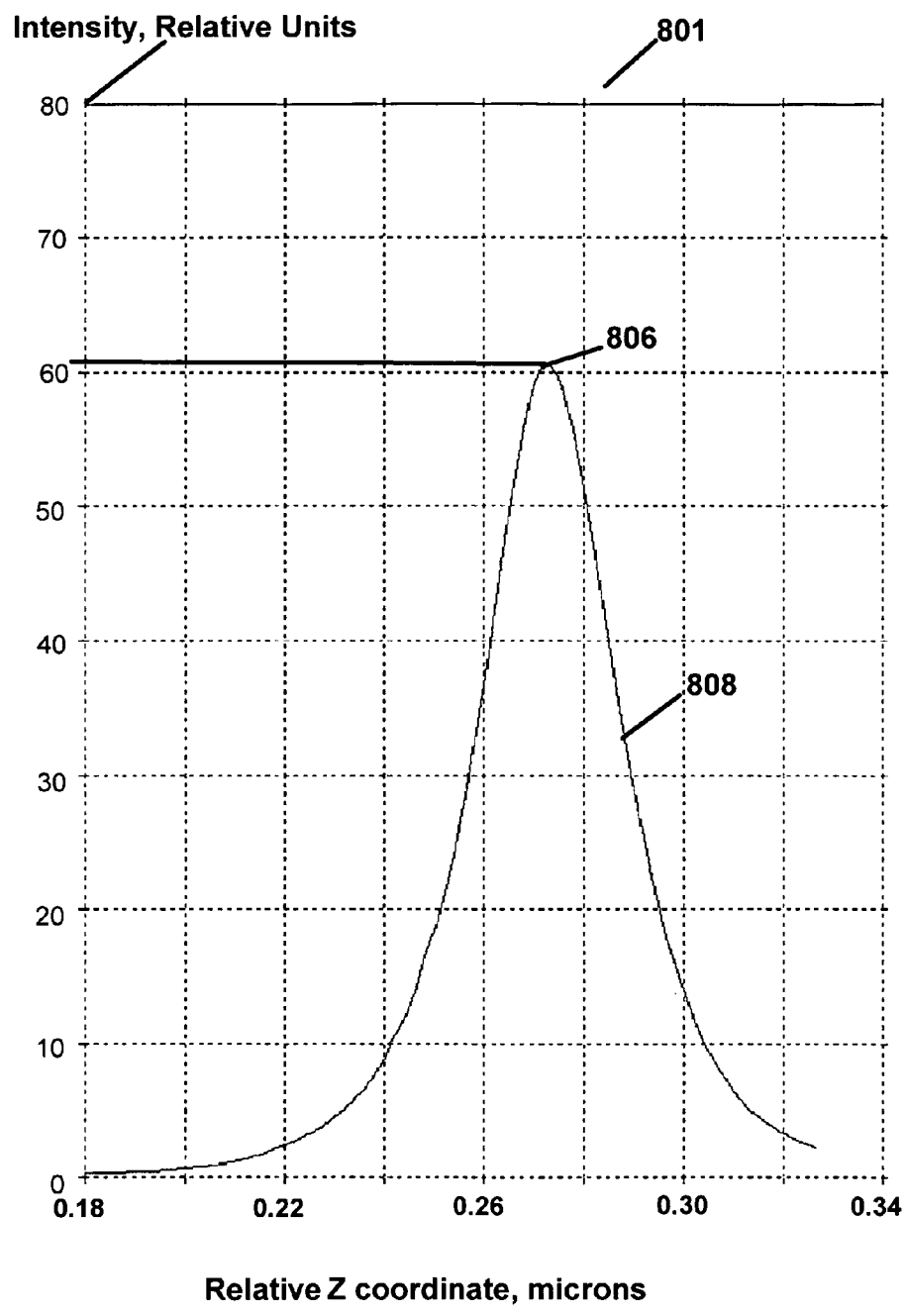

The "T" shaped aperture as described above in Example 2 was altered by decreasing dimension C from about 15 nm to about 10 nm, also decreasing dimension 612 from about 39 nm to about 34 nm. All other variables and dimensions remained as described in Example 2. Vertically polarized incident radiation (as shown in FIGS. 6a and 6d) of 1 micron wavelength produced a near-field source 636 having a peak intensity about 60.6 relative units, measured in a plane about 13 nm above the gold film in air. Horizontally polarized incident radiation (as shown in FIGS. 6b and 6d) of 1 micron wavelength produced near-field source 638 having a peak intensity of 56.2 relative units, measured in a plane about 13 nm above the gold film in air. These results are shown graphically in FIGS. 8a and 8b. FIG. 8a is a plot 800 of relative intensity versus position 802 measured along the Z axis of FIG. 6b for near-field source 638, horizontally polarized incident radiation. The maximum, or peak value 804 of intensity was about 56.2 relative units, i.e. 56.2 times the intensity of the input radiation. FIG. 8b is a plot 801 of intensity versus position 808 measured along the Z axis of FIG. 6a for near-field source 636, vertically polarized incident radiation. The maximum, or peak value 806 of intensity was about 60.6 relative units, i.e. 60.6 times the intensity of the input radiation. The ratio of the near-field source 638 peak intensity value to the near-field source 636 peak intensity value was 0.93, indicating well balanced brightness levels between near-field sources 636 and 638. The distance 644 between the centers of near-field sources 636 and 638 as measured from FIGS. 7a and 7b is about 43 nm, which coincides with the geometry of FIGS. 6a, b. For both polarizations, the width of the light source at high intensity maximum as shown in FIG. 8a, 8b is about 33 nm, placing both of them in the regime of subwavelength resolution. This example also affirms that a T-shaped aperture structure as illustrated in FIG. 6a, 6b can provide independently controlled near-field light sources, with approximately equal source intensity. The intensity of each individual source is much greater than the input. The sources are separated by a subwavelength distance and within tens of nanometers from each other.

The present invention is not limited by the previous embodiments heretofore described. Rather, the scope of the present invention is to be defined by these descriptions taken together with the attached claims and their equivalents.

What is claimed is:

1. An optical device for generating multiple near-field light sources comprising:
   a tee shaped aperture, fashioned in a conductive film having a thickness, said conductive film supported on a transparent dielectric material, said tee shaped aperture having a first rectangular shaped portion adjacent to a second rectangular shaped portion, said first rectangular shaped portion having a first width, said second rectangular shaped portion having a second width, said first width being measured parallel to said second width, said first width being greater than said second width, wherein a volume of said tee shaped aperture is filled with said transparent dielectric material, said volume being defined by an open cross sectional area of said tee shaped aperture and said thickness of said conductive film;
   a first ridge structure, extending a first portion of said conductive film into a central portion of said first rectangular shaped portion, in a first direction; and,
   a second ridge structure, extending a second portion of said conductive film into a central portion of said second rectangular shaped portion, in a second direction, said second direction being orthogonal to said first direction.

2. The device as recited in claim 1, wherein said thickness of said conductive film is between 5 nm and 500 nm.

3. The device as recited in claim 1, wherein said transparent dielectric material comprises at least one of oxides of silicon, oxides of aluminum, oxides of titanium, nitrides of silicon, silicon, and germanium.

4. The device as recited in claim 1, wherein said transparent dielectric material has a refractive index between 1.4 and 4.0.

5. The device as recited in claim 1, wherein said conductive film comprises at least one of copper, silver, gold, rhodium, platinum, ruthenium, and chromium.

6. The device as recited in claim 1, wherein said conductive film comprises gold.

7. The device as recited in claim 1, wherein
said first rectangular shaped portion of said tee aperture has a first length, said first ridge structure extends a second length into said first rectangular shaped portion of said tee aperture, and
said second length is less than said first length.

8. The device as recited in claim 1, wherein
said second ridge structure extends a third length into said second rectangular shaped portion of said tee aperture, and
said third length is less than one half of said second width.

9. The device as recited in claim 7, wherein
said first width is about 116 nm,
said first length is about 39 nm, and
said second length is about 24 nm.

10. The device as recited in claim 8, wherein
said third length is about 16 nm, and
said second width is about 52 nm.

11. An optical device for generating multiple near-field light sources comprising:
a tee shaped aperture, fashioned in a conductive film, said tee shaped aperture having a first rectangular shaped portion adjacent to a second rectangular shaped portion, said first rectangular shaped portion having a first width, said second rectangular shaped portion having a second width, said first width being measured parallel to said second width, said first width being greater than said second width;
a first ridge structure, extending a first portion of said conductive film into a central portion of said first rectangular shaped portion, in a first direction;
a second ridge structure, extending a second portion of said conductive film into a central portion of said second rectangular shaped portion, in a second direction, said second direction being orthogonal to said first direction; and
a light source, capable of illuminating at least a portion of said tee shaped aperture, wherein said optical device generates a first near-field light source proximate to and end of said first ridge structure when illuminated with light polarized in said first direction, and said optical device generates a second near-field light source proximate to an end of said second ridge structure when illuminated with light polarized in said second direction.

12. The device as recited in claim 11, wherein said first near-field light source is generated with light having a first wavelength, and said second near-field light source is generated with light having a second wavelength.

13. The device as recited in claim 12, wherein said first and said second wavelengths are between 200 nm and 2 microns.

* * * * *